United States Patent
Shao

(10) Patent No.: US 12,022,399 B2
(45) Date of Patent: Jun. 25, 2024

(54) POWER CONTROL DEVICE, METHOD, AND TERMINAL DEVICE

(71) Applicant: VIVO MOBILE COMMUNICATION CO., LTD., Guangdong (CN)

(72) Inventor: Chaojie Shao, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 486 days.

(21) Appl. No.: 17/510,147

(22) Filed: Oct. 25, 2021

(65) Prior Publication Data
US 2022/0046534 A1 Feb. 10, 2022

Related U.S. Application Data
(63) Continuation of application No. PCT/CN2020/081253, filed on Mar. 25, 2020.

(30) Foreign Application Priority Data
Apr. 25, 2019 (CN) .......................... 201910340733.2

(51) Int. Cl.
*H04W 4/00* (2018.01)
*H04W 52/02* (2009.01)

(52) U.S. Cl.
CPC ..... *H04W 52/028* (2013.01); *H04W 52/0235* (2013.01); *H04W 52/0238* (2013.01)

(58) Field of Classification Search
CPC .............. H04W 52/02; H04W 52/028; H04W 52/0238
See application file for complete search history.

(56) References Cited

U.S. PATENT DOCUMENTS

| 6,453,182 B1* | 9/2002 | Sprigg ............. H04W 52/0293 455/343.1 |
| 6,513,119 B1* | 1/2003 | Wenzel .................... G07C 9/37 340/505 |

(Continued)

FOREIGN PATENT DOCUMENTS

| CN | 101399862 A | 4/2009 |
| CN | 101924667 A | 12/2010 |

(Continued)

OTHER PUBLICATIONS

International Search Report of International Application No. PCT/CN2020/081253 mailed on Jul. 1, 2020.

(Continued)

*Primary Examiner* — Elisabeth Benoit Magloire
(74) *Attorney, Agent, or Firm* — IP & T GROUP LLP

(57) ABSTRACT

A power control device includes: a modem, a first power management module connected to the modem, an AP, a second power management module connected to the AP, and a control circuit connected to the AP, the first power management module and the second power management module. The second power management module is configured to output a second control signal to the first power management module. The AP is configured to generate a first control signal and output the first control signal to the control circuit in a case that a shutdown instruction is received or an abnormal power-down is detected. The control module is configured to convert the second control signal into a third control signal under control of the first control signal. The first power management module is configured to stop power supply to the modem under control of the third control signal.

16 Claims, 7 Drawing Sheets

(56) References Cited

U.S. PATENT DOCUMENTS

| | | | |
|---|---|---|---|
| 8,055,462 B1* | 11/2011 | Benckenstein, Jr. | G01R 31/382 702/65 |
| 2005/0206241 A1* | 9/2005 | Saxena | H02J 9/06 307/66 |
| 2014/0218078 A1 | 8/2014 | Nabhane et al. | |
| 2015/0364937 A1* | 12/2015 | Becerra | G06Q 30/06 320/101 |
| 2016/0087480 A1* | 3/2016 | Trudeau | G06F 1/24 320/108 |
| 2016/0224097 A1 | 8/2016 | Hirouchi | |
| 2016/0357245 A1 | 12/2016 | Heo et al. | |
| 2018/0004273 A1 | 1/2018 | Leucht-Roth et al. | |
| 2019/0197828 A1* | 6/2019 | Pettie | G07F 17/3244 |

FOREIGN PATENT DOCUMENTS

| | | |
|---|---|---|
| CN | 101951625 A | 1/2011 |
| CN | 102262432 A | 11/2011 |
| CN | 102547935 A | 7/2012 |
| CN | 102957806 A | 3/2013 |
| CN | 202949572 U | 5/2013 |
| CN | 108549593 A | 9/2018 |
| CN | 109327581 A | 2/2019 |
| CN | 110134216 A | 8/2019 |

OTHER PUBLICATIONS

Written Opinion of The International Searching Authority of International Application No. PCT/CN2020/081253 mailed on Jul. 1, 2020.

First Office Action of Priority Application No. 201910340733.2 mailed on Jun. 9, 2020.

* cited by examiner

POWER CONTROL DEVICE, METHOD, AND TERMINAL DEVICE

CROSS-REFERENCE TO RELATED APPLICATIONS

This application is a Bypass Continuation Application of PCT/CN2020/081253 filed on Mar. 25, 2020, which claims priority to Chinese Patent Application No. 201910340733.2 filed on Apr. 25, 2019, which are incorporated herein by reference in their entirety.

TECHNICAL FIELD

Embodiments of the present disclosure relate to the field of communications technologies, and in particular, to a power control device, method and a terminal device.

BACKGROUND

In the early days of the fifth-generation (5G) mobile communication technology, a central processing unit (CPU) of a terminal device uses a hybrid architecture of an application processor (AP) with an external 5G modem to meet the growing needs of users.

SUMMARY

According to a first aspect, an embodiment of the present disclosure provides a power control device, where the power control device includes: a modem, a first power management module connected to the modem, an AP, a second power management module connected to the AP, and a control circuit connected to the AP, the first power management module and the second power management module. Among them, the second power management module is configured to output a second control signal to the first power management module before the AP receives a shutdown instruction or an abnormal power-down is detected; the AP is configured to generate a first control signal and output the first control signal to the control circuit in the case that a shutdown instruction is received or an abnormal power-down is detected; the control circuit is configured to convert the second control signal into a third control signal under the control of the first control signal, so that the second power management module outputs the third control signal to the first power management module; the first power management module is configured to stop power supply to the modem under the control of the third control signal.

According to a second aspect, an embodiment of the present disclosure provides a terminal device, where the terminal device includes the power control device provided in the foregoing first aspect.

According to a third aspect, an embodiment of the present disclosure provides a power control method applied to a power control device, where the power control device includes a modem, a first power management module connected to the modem, an AP, and a second power management module connected to the AP. The method includes: generating a first control signal in the case that the AP receives a shutdown instruction or an abnormal power-down is detected; converting, under the control of the first control signal, a second control signal into a third control signal, where the second control signal is a signal output by the second power management module to the first power management module before the AP receives the shutdown instruction or the abnormal power-down is detected; stopping power supply to the modem under the control of the third control signal.

DETAILED DESCRIPTION OF EMBODIMENTS

Figure 1:
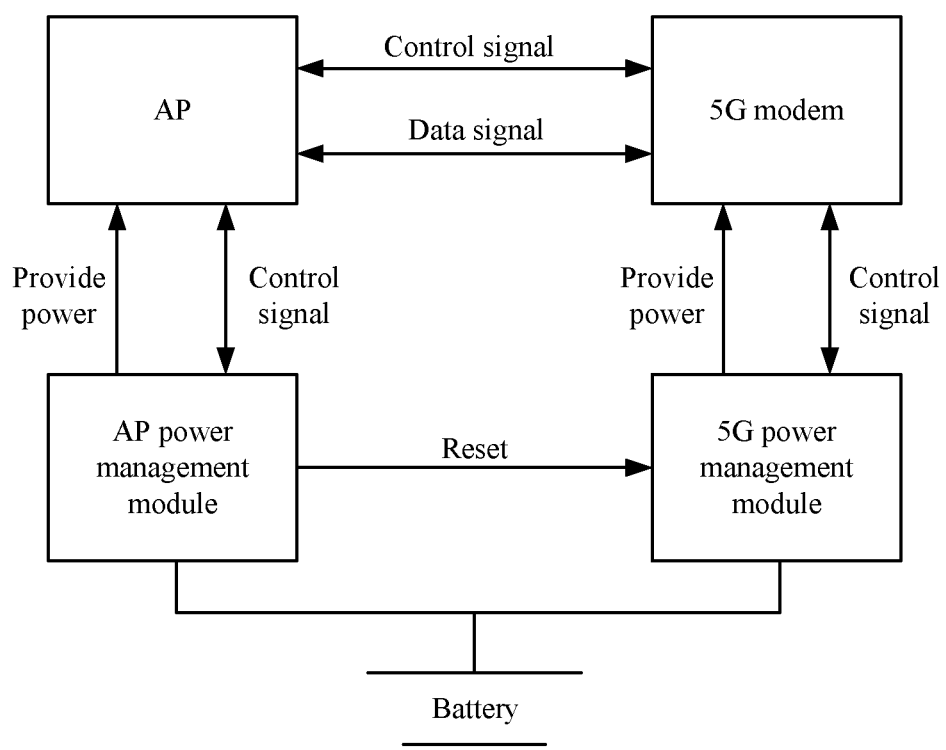
FIG. 1 is a first schematic diagrams of a power control device provided in an embodiment of the present disclosure.

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of the present disclosure, the terms such as "first" and "second" are used to distinguish between different objects, but are not used to describe a particular sequence of the objects. For example, a first power management module, a second power management module and the like are used to distinguish different power management modules, rather than to describe a specific order of the power management modules.

In the embodiments of the present disclosure, the word such as "example" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

In the description of the embodiments of the present disclosure, unless otherwise specified, the meaning of "a plurality of" means two or more. For example, a plurality of processing units mean two or more processing units.

The following describes some terms/nouns used in the embodiments of the present disclosure.

AP: also known as multimedia application processor, which is a very large scale integrated circuit that expands audio functions, video functions and dedicated interfaces on the basis of low-power CPU.

Modem: a device that converts a digital signal into an analog signal through modulation at a transmitting terminal, and converts an analog signal into a digital signal through demodulation at a receiving terminal.

Abnormal power-down: a phenomenon in which an electrical device (such as the AP in this embodiment of the present disclosure) cannot work normally due to power blackout, power loss, or substandard power quality.

Phase inverter: a device that can reverse the phase of an input signal by 180 degrees.

Field effect transistor: a semiconductor device that uses the electric field effect of a control input loop to control a flow of current in an output loop.

Currently, the AP and 5G modem have their independent power supply systems. Generally, as shown in FIG. 1, in a case that the AP receives a shutdown instruction, the AP may generate a shutdown signal according to the shutdown instruction and send the shutdown signal to the 5G modem, and then the 5G modem may generate a shutdown control signal according to the shutdown signal and send the shutdown control signal to a 5G power management module, so that the 5G power management module can perform shutdown processing on the 5G modem according to the shutdown control signal. Alternatively, in the case that the AP receives a shutdown instruction, the AP may generate a control signal according to the shutdown instruction and send the control signal to an AP power management module, and then the AP power management module may generate another control signal (such as a reset signal) according to the control signal and send the reset signal to a 5G power management module, so that the 5G power management module can perform shutdown processing on the 5G modem according to the reset signal.

However, in the case of anomaly (such as software blocking, or the like) in communication between the AP and the 5G modem, or in the case of anomaly in communication between the AP and the AP power management module, the AP may fail to control the shutdown of the 5G modem if the foregoing two methods are used to control the shutdown of the 5G modem, which may lead to the situation that the AP has been shut down but the 5G modem has not been shut down in the terminal device, resulting in abnormal power consumption of the terminal device.

The embodiments of the present disclosure provide a power control device, method, and a terminal device. The power control device may include: a modem, a first power management module connected to the modem, an AP, a second power management module connected to the AP, and a control circuit connected to the AP, the first power management module, and the second power management module. Among them, the second power management module is configured to output a second control signal to the first power management module before the AP receives a shutdown instruction or an abnormal power-down is detected; the AP is configured to generate a first control signal and output the first control signal to the control circuit in the case that a shutdown instruction is received or an abnormal power-down is detected; the control circuit is configured to convert the second control signal into a third control signal under the control of the first control signal, so that the second power management module outputs the third control signal to the first power management module; the first power management module is configured to stop power supply to the modem under the control of the third control signal. With this solution, after the AP receives the shutdown instruction or the abnormal power-down is detected, a control signal may be output to the control circuit to trigger the control circuit to convert, under the control of the control signal, the second control signal output by the second power management module to the first power management module into the third control signal, so that the first power management module stops power supply to the modem under the control of the third control signal. In this way, in the case that the AP receives a shutdown instruction or an abnormal power-down is detected, even in the case of anomaly in communication between the AP and the modem, the power control device provided in this embodiment of the present disclosure can still trigger the control circuit to control conversion of the second control signal output by the second power management module to the first power management module into a third control signal by outputting a control signal to the control circuit, so as to control the first power management module to stop power supply to the modem, that is, shutdown of the modem can be controlled, thereby avoiding abnormal power consumption of a terminal device due to shutdown failure of the modem.

The following provides exemplary description of the power control device, method, and a terminal device provided in the embodiments of the present disclosure with reference to the accompanying drawings.

Figure 2:
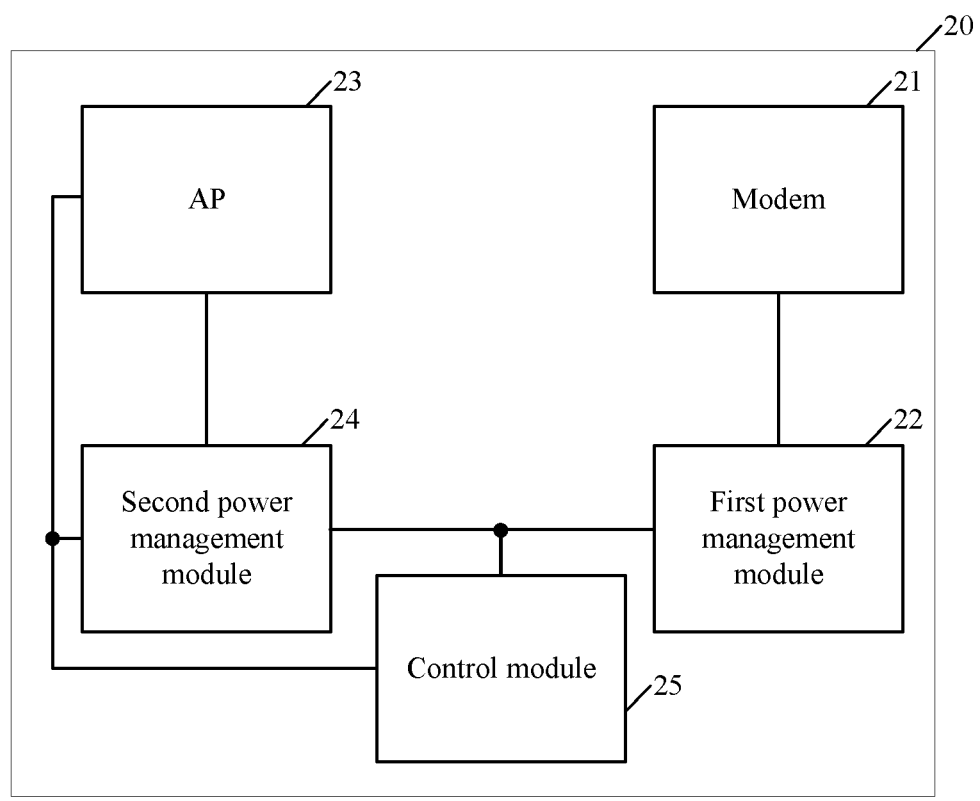
FIG. 2 is a second schematic diagram of a power control device provided in an embodiment of the present disclosure.

As shown in FIG. 2, an embodiment of the present disclosure provides a power control device 20. The power control device 20 may include a modem 21, a first power management module 22 connected to the modem 21, an AP 23, a second power management module 24 connected to the AP 23, and a control circuit 25 connected to the AP 23, the first power management module 22, and the second power management module 24.

Among them, the second power management module 24 is configured to output a second control signal to the first power management module before the AP 23 receives a shutdown instruction or an abnormal power-down is detected; the AP 23 is configured to generate a first control signal and output the first control signal to the control circuit 25 in the case that a shutdown instruction is received or an abnormal power-down is detected; the control circuit 25 is configured to convert the second control signal into a third control signal under the control of the first control signal, so that the second power management module 24 outputs the third control signal to the first power management module 22; the first power management module 22 is configured to stop power supply to the modem under the control of the third control signal 21.

It can be understood that, in this embodiment of the present disclosure, the first power management module may be a power management module for the modem, that is, the first power management module may be configured to supply power to the modem or stop power supply to the modem. The second power management module may be a power management module for the AP, that is, the second power management module may be configured to supply power to the AP or stop power supply to the AP.

In this embodiment of the present disclosure, in the case that the AP receives a shutdown instruction or an abnormal power-down is detected, the AP may generate a first control signal and output the first control signal to the control circuit. In this way, the control circuit may, under the control of the first control signal, convert the second control signal output by the second power management module to the first power management module into a third control signal, so that the second power management module outputs the third control signal to the first power management module, that is, the first power management module receives the third control signal sent by the second power management module, and then the first power management module can stop power supply to the modem under the control of the third control signal, that is, control the modem to shut down, so that shutdown of the modem can be controlled in a normal way in the case that the AP receives a shutdown instruction or an abnormal power-down is detected.

Optionally, in this embodiment of the present disclosure, the foregoing modem may be a 5G modem, that is, the modem may include a 5G system. Correspondingly, the AP may include another system (such as a 3G system, a 4G system). Among them, the 5G system may include 5G-related information (such as program information, configuration information) in a terminal device; the 4G system may include 4G-related information in a terminal device; the 3G system may include 3G-related information in a terminal device.

It can be understood that, in actual implementation, the system included in the modem and the AP may also be any other possible systems, and may be determined as required in an actual use, which is not limited in the embodiments of the present disclosure.

In this embodiment of the present disclosure, the foregoing shutdown instruction may be an instruction instructing a power control device to perform power-off processing (that is, shutdown).

Optionally, in this embodiment of the present disclosure, when the power control device in this embodiment of the present disclosure is applied to a terminal device, timing for the foregoing AP to receive the foregoing shutdown instruction may include: any timing when the terminal device receives a user-triggered shutdown instruction, when a system of the terminal device gives a forced shutdown instruction, or the like. This may be determined based on an actual use requirement, and is not limited in this embodiment of the present disclosure.

Exemplarily, in this embodiment of the present disclosure, the foregoing user-triggered shutdown instruction may be a shutdown instruction triggered by the user's input on a shutdown control of the terminal device. The giving a forced shutdown instruction by the system of the foregoing terminal device may be a shutdown instruction given by the terminal device after determining that it satisfies a preset condition. Among them, the preset condition may include any possible condition such as the condition that the terminal device receives an input that the user presses a power button for a duration greater than or equal to a time threshold (a numeric value preset in the terminal device), which may be determined according to an actual usage requirement. This is not limited in the embodiments of the present disclosure.

It should be noted that the abnormal power-down in this embodiment of the present disclosure may be used to indicate the AP's abnormal power-down. For example, the AP suffers sudden power loss or power blackout.

Optionally, in this embodiment of the present disclosure, the AP may be connected to the control circuit through a power supply hold signal (PS_hold) pin of the AP.

It can be understood that the AP may output the foregoing first control signal to the control circuit through the PS_hold pin.

In this embodiment of the present disclosure, as the AP is connected to the control circuit through the PS_hold pin, in the case that the AP receives a shutdown instruction or an abnormal power-down is detected, even in the case of anomaly in communication between the AP and the modem, in the power control device provided in this embodiment of the present disclosure, it is still possible to output the first control signal to the control circuit, so that the control circuit converts, under the control of the first control signal, the second control signal output by the second power management module to the first power management module into a third control signal, and then the first power management module can stop power supply to the modem under the control of the third control signal, that is, control the modem to shut down, thereby controlling the modem to shut down in a normal way when the AP receives the shutdown instruction or the abnormal power-down is detected.

In this embodiment of the present disclosure, if the signal output by the second power management module to the first power management module is the foregoing second control signal, the first power management module maintains, under the control of the second control signal, power supply to the modem. If the signal output by the second power management module to the first power management module is the foregoing third control signal, the first power management module stops power supply to the modem under the control of the third control signal.

Optionally, in this embodiment of the present disclosure, the foregoing first control signal may be a low-level control signal, the foregoing second control signal may be a high-level reset signal, and the foregoing third control signal may be a low-level reset signal.

It is sure that in actual implementation, the foregoing first control signal, second control signal, and third control signal may also be any other possible signals, and may be determined according to an actual use requirement, which is not limited in the embodiments of the present disclosure.

In this embodiment of the present disclosure, before the AP receives a shutdown instruction or an abnormal power-down is detected, the second power management module may output a high-level reset signal (that is, the foregoing second control signal) to the first power management module. In the case that the AP receives a shutdown instruction or an abnormal power-down is detected, the AP may generate a low-level control signal (that is, the foregoing first control signal), and output the low-level control signal through the PS_hold pin of the AP to the control circuit, so that the control circuit can convert, under the control of the low-level control signal, the high-level reset signal output by the second power management module to the first power management module into a low-level reset signal (that is, the foregoing third control signal), and then the first power management module can stop, under the control of the low-level reset signal, power supply to the modem.

It can be understood that, in this embodiment of the present disclosure, if the control signal output by the second power management module to the first power management module is a high-level reset signal (that is, the control signal received by the first power management module is a high-level reset signal), the first power management module maintains power supply to the modem. If the control signal output by the second power management module to the first power management module is a low-level reset signal (that is, the control signal received by the first power management module is a low-level reset signal), the first power management module stops power supply to the modem.

Optionally, in this embodiment of the present disclosure, before the AP receives a shutdown instruction or an abnormal power-down is detected, the AP may output a high-level control signal to the control circuit, to control the first power management module to maintain power supply to the modem.

For example, the AP may output a high-level control signal to the control circuit through the PS_hold pin of the AP, so that the control circuit cannot control conversion of the second control signal into the third control signal, that is, the second power management module outputs the foregoing second control signal to the first power management module, so that the first power management module maintains, under the control of the second control signal, power supply to the modem.

The embodiment of the present disclosure provides a power control device, where after the AP receives the shutdown instruction or the abnormal power-down is detected, a control signal may be output to the control circuit to trigger the control circuit to convert, under the control of the control signal, the second control signal output by the second power management module to the first power management module into the third control signal, so that the first power management module stops power supply to the modem under the control of the third control signal. In this way, in the case that the AP receives a shutdown instruction or an abnormal power-down is detected, even in the case of anomaly in communication between the AP and the modem, the power control device provided in this embodiment of the present disclosure can still trigger the control circuit to control conversion of the second control signal output by the second power management module to the first power management module into a third control signal by outputting a control signal to the control circuit, so as to control the first power management module to stop power supply to the modem, that is, shutdown of the modem can be controlled, thereby avoiding abnormal power consumption of a terminal device due to shutdown failure of the modem.

Optionally, as shown in FIG. 2, the AP 23 in the power control device 20 provided by the embodiment of the present disclosure may also be configured to output the foregoing first control signal to the second power management module 24; the second power management module 24 may be configured to stop power supply to AP 23 under the control of the first control signal.

In this embodiment of the present disclosure, after the AP generates the foregoing first control signal, the AP may also output the first control signal to the second power management module. In this way, the second power management module can stop power supply to the AP under the control of the first control signal, that is, control the AP to shut down, so that the AP can be controlled to shut down normally in the case that the AP receives a shutdown instruction or an abnormal power-down is detected.

In the embodiments of the present disclosure, for the related description of the shutdown instruction and the abnormal power-down, reference may be made to the detailed description of the shutdown instruction and the abnormal power-down in the foregoing embodiment, and details are not described again in this embodiment.

Optionally, in this embodiment of the present disclosure, the AP may be connected to the second power management module through the PS_hold pin of the AP.

It can be understood that the AP may output the foregoing first control signal to the second power management module through the PS_hold pin.

Exemplarily, in this embodiment of the present disclosure, in the case that the AP receives a shutdown instruction or an abnormal power-down is detected, the AP may generate a low-level control signal (that is, the foregoing first control signal) and output the low-level control signal from the PS_hold pin of the AP to the second power management module, so that the second power management module can stop power supply to the AP under the control of the low-level control signal.

Optionally, in this embodiment of the present disclosure, before the AP receives a shutdown instruction or an abnormal power-down is detected, the AP may output a high-level control signal to the second power management module, to control the second power management module to maintain power supply to the AP.

For example, the AP may output the high-level control signal to the second power management module through the PS_hold pin of the AP, so that the second power management module maintains power supply to the AP.

It can be understood that, in this embodiment of the present disclosure, if a signal output by the AP to the second power management module is a high-level control signal, the second power management module maintains power supply to the AP under the control of the high-level control signal. If a signal output by the AP to the second power management module is the foregoing low-level control signal, the second power management module stops power supply to the AP under the control of the low-level control signal.

In this embodiment of the present disclosure, after the AP generates the foregoing first control signal, the AP may output the first control signal to the second power management module, so that the second power management module stops power supply to the AP under the control of the first control signal. In this way, in the case that the AP receives a shutdown instruction or an abnormal power-down is detected, the power control device provided in this embodiment of the present disclosure can trigger the second power management module to stop power supply to the AP by outputting the first control signal to the second power management module, that is, the AP can be controlled to shut down, thereby avoiding abnormal power consumption of a terminal device due to shutdown failure of the AP.

In this embodiment of the present disclosure, as the control circuit is connected to the AP, the first power management module, and the second power management module, after the control circuit receives the foregoing first control signal, the control circuit may convert, under the control of the first control signal, the second control signal output by the second power management module to the first power management module into a third control signal, so that the second power management module outputs the third control signal to the first power management module. Then, the first power management module can stop power supply to the modem under the control of the third control signal, that is, control the modem to shut down.

Optionally, in this embodiment of the present disclosure, the control circuit may include two possible implementation manners, which are a first implementation manner and a second implementation manner described in the following embodiments, respectively. The following is an exemplary description of these two possible implementation manners (that is, the first implementation manner and the second implementation manner described below).

It can be understood that, in actual implementation, the implementation manner for the foregoing control circuit may also be any other possible implementation manner. This may be determined based on an actual use requirement, and is not limited in this embodiment of the present disclosure.

Figure 3:
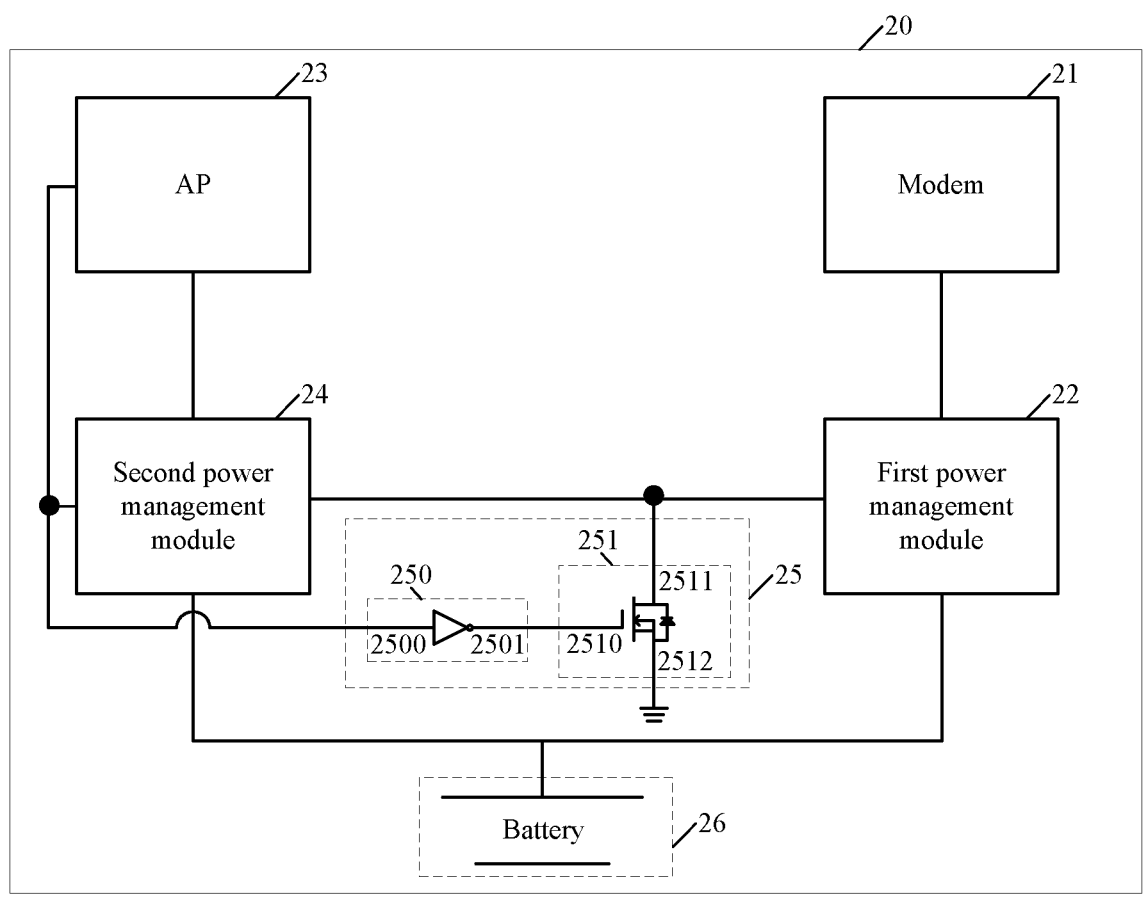
FIG. 3 is a third schematic diagram of a power control device provided in an embodiment of the present disclosure.

The first implementation manner: with reference to FIG. 2, as shown in FIG. 3, the foregoing control circuit 25 may include a phase inverter 250 and a switching transistor 251.

An input terminal 2500 of the phase inverter 250 is connected to the AP 23, an output terminal 2501 of the phase inverter 250 is connected to a first terminal 2510 of the switching transistor 251, and a second terminal 2511 of the switching transistor 251 is connected to both the first power management module 22 and the second power management module 24, and a third terminal 2512 of the switching transistor 251 is grounded.

The following is an exemplary description of the operating principle of the power control device provided by the embodiment of the present disclosure with reference to FIG. 3.

In this embodiment of the present disclosure, assuming that the foregoing first control signal is a low-level control signal, the foregoing second control signal is a high-level reset signal, and the foregoing third control signal is a low-level reset signal, as shown in FIG. 3, when the AP 23 receives a shutdown instruction or an abnormal power-down is detected, the AP 23 may generate a low-level control signal (that is, the first control signal), and output the low-level control signal to the input terminal 2500 of the foregoing phase inverter 250. After receiving the low-level control signal, the phase inverter 250 may invert the phase of the low-level control signal by 180 degrees to obtain a high-level control signal, and output it to the first terminal 2510 of the switching transistor 251 through the output terminal 2501 of the phase inverter 250. After the switching transistor 251 receives the high-level control signal, in the case that the high-level control signal satisfies a continuity condition of the switching transistor 251, the high-level control signal can control continuity of the switching transistor 251, that is, make the second terminal 2511 of the switching transistor 251 and the third terminal 2512 of the switching transistor 251 continued. In addition, as the third terminal 2512 of the switching transistor 251 is grounded, after the second terminal 2511 of the switching transistor 251 and the third terminal 2512 of the switching transistor 251 are continued, the level of the second terminal 2511 of the switching transistor 251 is low level so that the high-level reset signal output by the second power management module 24 to the first power management module 22 is pulled down and converted into a low-level reset signal (that is, controlling the conversion of the second control signal into the third control signal).

In this way, the second power management module 24 can output the low-level reset signal to the first power management module 22. Then when the first power management module 22 receives the low-level reset signal, the first power management module 22 may stop power supply to the modem 21 by means of resetting (that is, the first power management module 22 is under the control of the low-level reset signal). In this embodiment of the present disclosure, a continuity condition for the foregoing switching transistor may be: when a voltage received by the first terminal of the switching transistor is greater than or equal to a continuity voltage of the switching transistor, the switching transistor is continued.

In this embodiment of the present disclosure, as the field effect transistor has a switching feature, the field effect transistor can be used as a switching transistor.

Optionally, for the foregoing "first implementation manner", the foregoing phase inverter may be a NOT gate, and the foregoing switching transistor may be an N-type field effect transistor. For example, the N-type field effect transistor may be an N-channel metal-oxide semiconductor field effect transistor (MOSFET).

Optionally, in this embodiment of the present disclosure, in the case that the foregoing switching transistor is an N-type field effect transistor, the first terminal of the switching transistor may be the gate (G) of the N-type field effect transistor, and the second terminal of the switching transistor may be the source (S) of the N-type field effect transistor, and the third terminal of the switching transistor may be the drain (D) of the N-type field effect transistor.

It should be noted that in this embodiment of the present disclosure, as the N-type field effect transistor is a field effect transistor with high-level continuity, the switching transistor may be a switching transistor with high-level continuity in the case that the foregoing switching transistor is an N-type field effect transistor.

Exemplarily, in this embodiment of the present disclosure, it is assumed that the foregoing first control signal is a low-level control signal, the foregoing second control signal is a high-level reset signal, and the foregoing third control signal is a low-level reset signal; the AP is connected to the input terminal of the phase inverter through the PS hold pin of the AP. In this way, when the AP receives the foregoing shutdown instruction or an abnormal power-down is detected, the AP may generate a low-level control signal (that is, the first control signal), and output the low-level control signal to the input terminal of the phase inverter through the PS_hold pin of the AP. After receiving the low-level control signal, the phase inverter may invert the phase of the low-level control signal by 180 degrees to obtain a high-level control signal, and output the high-level control signal to the gate of the N-channel MOSFET (that is, the first terminal of the switching transistor) through the output terminal of the phase inverter. As the N-channel MOSFET is a MOSFET with high-level continuity, the high-level control signal can control the continuity of the N-channel MOSFET, that is, make the source of the N-channel MOSFET and the drain of the N-channel MOSFET continued. Moreover, as the drain of the N-channel MOSFET is grounded, after the source of the N-channel MOSFET and the drain of the N-channel MOSFET are continued, the source of the N-channel MOSFET is low level, so that the second control signal output by the second power management module to the first power management module is pulled down, that is, controlling the conversion of the high-level reset signal output by the second power management module to the first power management module into a low-level reset signal. In this way, the second power management module can output the low-level reset signal to the first power management module. Then, after the first power management module receives the low-level reset signal, the first power management module may stop power supply to the modem by means of resetting, that is, control the modem to shut down.

It should be noted that, as shown in FIG. 3, the power control device 20 provided by the embodiment of the present disclosure may further include a battery 26 connected to both the first power management module 22 and the second power management module 24.

The battery 26 may be a power supply in the power control device provided by the embodiment of the present disclosure, and is configured to provide electric power to the first power management module 22 and the second power management module 24.

In this embodiment of the present disclosure, the battery can provide electric power to the first power management module, and then after the first power management module obtains the electric power, the first power management module can convert the electric power obtained from the battery into electric power matching the modem, so as to supply power to the modem.

Correspondingly, the battery can provide electric power to the second power management module, and then after the second power management module obtains the electric power, the second power management module can convert the electric power obtained from the battery into electric power matching the AP, so as to supply power to the AP.

Optionally, in this embodiment of the present disclosure, the first power management module may stop obtaining electric power from the battery by disconnecting a path between the first power management module and the battery (for example, setting the battery input signal to low level, or the like), thereby stopping power supply to the modem.

Correspondingly, the second power management module may stop obtaining electric power from the battery by disconnecting a path between the second power management module and the battery (for example, setting the battery input signal to low level, or the like), thereby stopping power supply to the AP.

It is sure that, in actual implementation, the first power management module may also utilize any other possible methods to stop power supply to the modem, and the second power management module may also utilize any other possible methods to stop power supply to the AP. This may be determined based on an actual use requirement, and is not limited in this embodiment of the present disclosure.

Optionally, in the power control device provided by the embodiment of the present disclosure, the foregoing battery may be one battery or two batteries. This may be determined based on an actual use requirement, and is not limited in this embodiment of the present disclosure.

In this embodiment of the present disclosure, in the case that the battery in the power control device is one battery, the battery can supply power to both the first power management module and the second power management module. In the case that the battery in the power control device is two batteries, one of the two batteries may supply power to the first power management module, and the other battery may supply power to the second power management module.

Optionally, in this embodiment of the present disclosure, the foregoing battery may be a battery built in the power management module, or an independent battery. This may be determined based on an actual use requirement, and is not limited in this embodiment of the present disclosure.

Exemplarily, in this embodiment of the present disclosure, the foregoing battery may be a battery in a terminal device.

It should be noted that in this embodiment of the present disclosure, the battery 26 in the foregoing embodiment corresponding to FIG. 3 is described as a battery built in the power management module as an example and supplies power to both the first power management module 22 and the second power management module 24. For other battery forms, a power supply mode for the first power management module and the second power management module is similar to such a power supply mode, and details are not described again in this embodiment.

In this embodiment of the present disclosure, as the phase inverter has a function of inverting a signal phase, the switching transistor can be continued or discontinued according to a level of an input signal. Therefore, in the case that the phase inverter is combined with the switching transistor to act as a control circuit, it is possible to reliably control the conversion of the second control signal into the third control signal under the control of the first control signal in the case that the AP receives a shutdown instruction or an abnormal power-down is detected, so that the first power management module stops power supply to the modem under the control of the third control signal.

Figure 4:
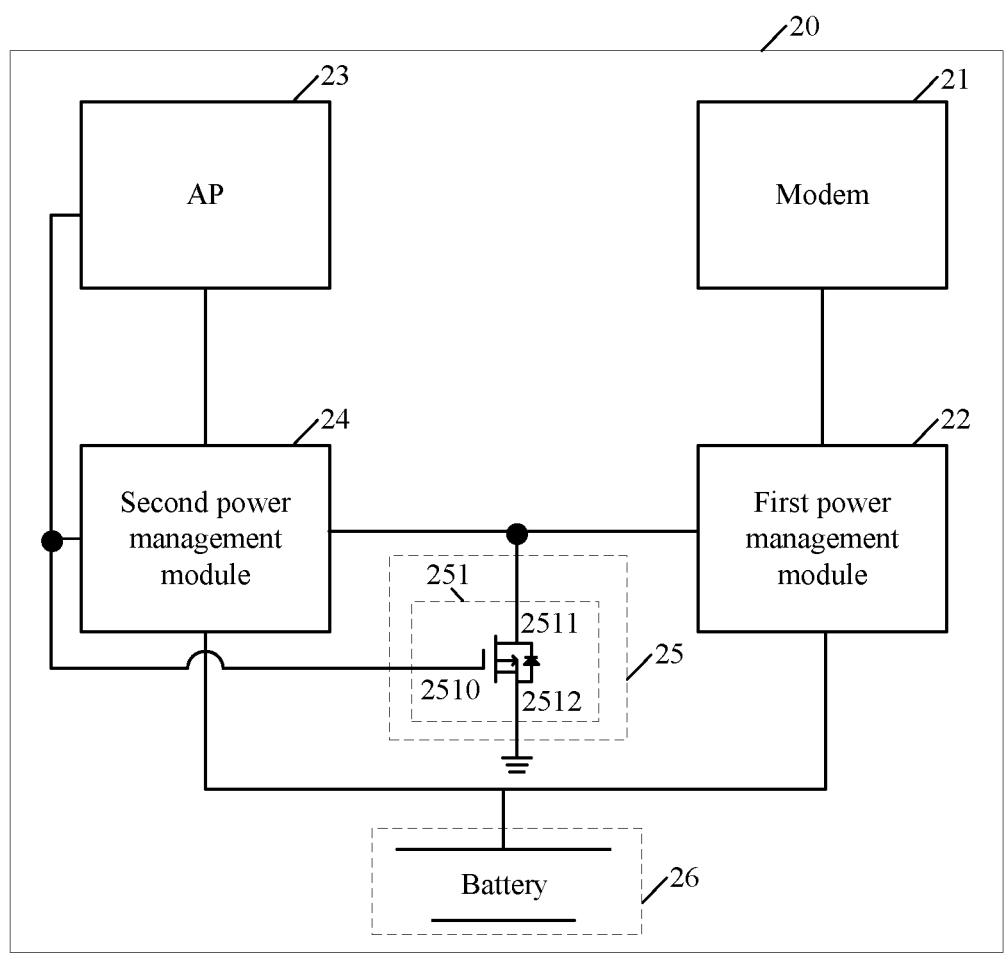
FIG. 4 is a fourth schematic diagrams of a power control device provided in an embodiment of the present disclosure.

Second implementation manner: with reference to FIG. 2, as shown in FIG. 4, a control circuit 25 includes a switching transistor 251.

A first terminal 2510 of the switching transistor 251 is connected to an AP 23, a second terminal 2511 of the switching transistor 251 is connected to both a first power management module 22 and a second power management module 24, and a third terminal 2512 of the switching transistor 251 is grounded.

The following is an exemplary description of the operating principle of the power control device provided by the embodiment of the present disclosure with reference to FIG. 4.

In this embodiment of the present disclosure, assuming that the foregoing first control signal is a low-level control signal, the foregoing second control signal is a high-level reset signal, and the foregoing third control signal is a low-level reset signal, as shown in FIG. 4, when the AP 23 receives a shutdown instruction or an abnormal power-down is detected, the AP 23 may generate a low-level control signal (that is, the first control signal), and output the low-level control signal to the first terminal 2510 of the switching transistor 251. After the switching transistor 251 receives the low-level control signal, in the case that the low-level control signal satisfies a continuity condition of the switching transistor 251, the low-level control signal can control continuity of the switching transistor 251, that is, make the second terminal 2511 of the switching transistor 251 and the third terminal 2512 of the switching transistor 251 continued. In addition, as the third terminal 2512 of the switching transistor 251 is grounded, after the second terminal 2511 of the switching transistor 251 and the third terminal 2512 of the switching transistor 251 are continued, the level of the second terminal 2511 of the switching transistor 251 is low level, so that the high-level reset signal output by the second power management module 24 to the first power management module 22 is pulled down and converted into a low-level reset signal (that is, controlling the conversion of the second control signal into the third control signal). In this way, the second power management module 24 outputs the low-level reset signal to the first power management module 22. Then when the first power management module 22 receives the low-level reset signal, the first power management module 22 may stop power supply to the modem 21 by means of resetting (that is, the first power management module 22 is under the control of the low-level reset signal).

In this embodiment of the present disclosure, for the relevant description of the foregoing continuity condition, reference may be made to the detailed description of the continuity condition in the foregoing "first implementation manner" for details, and details are not described again in this embodiment.

Optionally, for the foregoing "second implementation manner", the foregoing switching transistor is a P-type field effect transistor. For example, the P-type field effect transistor may be a P-channel MOSFET.

In this embodiment of the present disclosure, in the case that the foregoing switching transistor is a P-type field effect transistor, the first terminal of the switching transistor may be the gate (G) of the P-type field effect transistor, and the second terminal of the switching transistor may be the source (S) of the P-type field effect transistor, and the third terminal of the switching transistor may be the drain (D) of the P-type field effect transistor.

It should be noted that in the embodiments of the present disclosure, as the P-type field effect transistor is a field effect transistor with low-level continuity, the switching transistor may be a switching transistor with low-level continuity in the case that the foregoing switching transistor is a P-type field effect transistor.

Exemplarily, in this embodiment of the present disclosure, it is assumed that the foregoing first control signal is a low-level control signal, the foregoing second control signal is a high-level reset signal, and the foregoing third control signal is a low-level reset signal; the AP is connected to the input terminal of the phase inverter through the PS hold pin of the AP. Then, when the AP receives the foregoing shutdown instruction or an abnormal power-down is detected, the AP may generate a low-level control signal (that is, the first control signal), and output the low-level control signal to the gate of the P-channel MOSFET (that is, the first terminal of the switching transistor) through the PS_hold pin of the AP. As the P-channel MOSFET is a MOSFET with low-level continuity, the low-level control signal can control the continuity of the P-channel MOSFET, that is, make the source of the P-channel MOSFET and the drain of the P-channel MOSFET continued. Moreover, as the drain of the P-channel MOSFET is grounded, after the source of the P-channel MOSFET and the drain of the P-channel MOSFET are continued, the source of the P-channel MOSFET is low level, so that the second control signal output by the second power management module to the first power management module is pulled down, that is, controlling the conversion of the high-level reset signal output by the second power management module to the first power management module into a low-level reset signal. In this way, the second power management module can output the low-level reset signal to the first power management module. Then, after the first power management module receives the low-level reset signal, the first power management module may stop power supply to the modem by means of resetting, that is, control the modem to shut down.

It should be noted that, as shown in FIG. 4, the power control device 20 provided by the embodiment of the present disclosure may further include a battery 26 connected to both the first power management module 22 and the second power management module 24.

The battery 26 may be a power supply in the power control device provided by the embodiment of the present disclosure, and is configured to provide electric power to the first power management module 22 and the second power management module 24.

In this embodiment of the present disclosure, for the relevant description of the battery, reference may be made to the detailed description of the battery in the embodiment corresponding to the foregoing "first implementation manner" for details, and details are not described again in this embodiment.

In this embodiment of the present disclosure, as the switching transistor can be continued or discontinued according to a level of an input signal. For that reason, in the case that the switching transistor is used as the foregoing control circuit, it is possible to control continuity of the switching transistor and conversion of the forgoing second control signal into the foregoing third control signal under the control of the foregoing first control signal in the case that the AP receives a shutdown instruction or an abnormal power-down is detected, thereby allowing the first power management module to stop power supply to the foregoing modem under the control of the third control signal, and allowing a circuit structure to be simple and easy to implement.

Optionally, connection relationships between various modules (for example, the modem and the AP) in the power control device provided in this embodiment of the present disclosure may also include other connection relationships.

Figure 5:
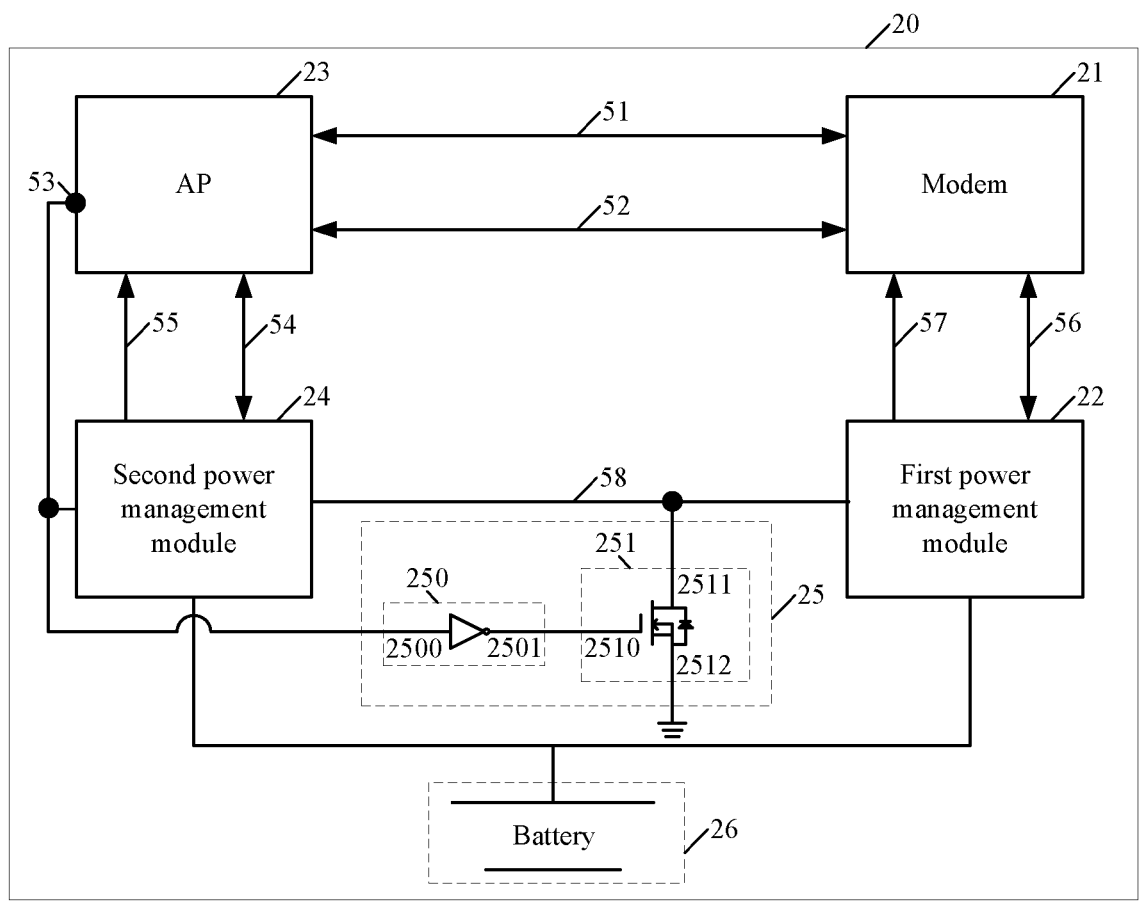
FIG. 5 is a fifth schematic diagram of a power control device provided in an embodiment of the present disclosure.

Exemplarily, with reference to FIG. 3, as shown in FIG. 5, connection relationships between the various modules in the power control device provided in this embodiment of the present disclosure are exemplarily explained.

In this embodiment of the present disclosure, as shown in FIG. 5, in a power control device 20 provided by the embodiment of the present disclosure, a modem 21 and an AP 23 may be connected through a signal line, and the signal line may include a first control signal line 51 and a data signal line 52. Among them, the first control signal line 51 is configured for the modem 21 and the AP 23 to transmit a control signal, and the first data signal line 52 is configured for the modem 21 and the AP 23 to transmit a data signal.

In this embodiment of the present disclosure, as shown in FIG. 5, in the power control device 20 provided in this embodiment of the present disclosure, the AP 23 may be connected to a second power management module 24 through a PS_hold pin 53 of the AP 23. The AP 23 and the second power management module 24 may also be connected through a second control signal line 54, and the AP 23 and the second power management module 24 may also be connected through a first power supply line 55. Among them, the second control signal line 54 is configured for the AP 23 and the second power management module 24 to transmit a control signal, and the first power supply line 55 is configured for the second power management module 24 to supply power to the AP 23.

In this embodiment of the present disclosure, as shown in FIG. 5, in the power control device 20 provided in this embodiment of the present disclosure, the modem 21 and the first power management module 22 may be connected through a third control signal line 56, and the modem 21 and the first power management module 22 may also be connected through a second power supply line 57. Among them, the third control signal line 56 is configured for the modem 21 and the first power management module 22 to transmit a control signal, and the second power supply line 57 is configured for the first power management module 22 to supply power to the modem 21.

In this embodiment of the present disclosure, as shown in FIG. 5, in the power control device 20 provided in this embodiment of the present disclosure, the AP 23 may be connected to a control circuit 25 through the PS_hold pin 53 of the AP 23. The second power management module 24 and the first power management module may be connected through a fourth control signal line 58, and the control circuit 25 is connected to the fourth control signal line 58. Among them, the fourth control signal line 58 is configured for the second power management module 24 to transmit a holding signal (for example, a second control signal in this embodiment of the present disclosure) or a reset signal (for example, a third control signal in this embodiment of the present disclosure) to the first power management module 22.

It should be noted that, in this embodiment of the present disclosure, the arrow direction in the signal line shown in FIG. 5 is used to indicate a direction of a signal in the signal line.

Optionally, in this embodiment of the present disclosure, after the AP receives a shutdown instruction, the power control device provided in this embodiment of the present disclosure may also control the first power management module to stop power supply to the modem by using at least one of the following two methods. Among them, the two methods are Method 1 and Method 2 respectively described in the following embodiment. The following is an exemplary description of the two methods (that is, Method 1 and Method 2 described below).

Method 1: after the AP receives a shutdown instruction, the AP may output a target data signal to the modem through the foregoing first data signal line (for the purpose of notifying the modem to perform shutdown processing). Then, after the modem receives the target data signal, the modem may output, according to the target data signal, a control signal (hereinafter referred to as a fourth control signal) to the first power management module through the foregoing second control signal line. In this way, the first power management module can stop power supply to the modem under the control of the fourth control signal, that is, control the modem to shut down, so that it is possible to control the modem to shut down normally in the case that the AP receives a shutdown instruction.

Method 2: after the AP receives a shutdown instruction, the AP may output a control signal (hereinafter referred to as a fifth control signal) to the second power management module through the foregoing third control signal line. Then, the second power management module outputs, under the control of the fifth control signal, a low-level reset signal to the first power management module (it may be understood that the second power management module now outputs the foregoing third control signal to the first power management module). In this way, the first power management module can stop power supply to the modem under the control of the low-level reset signal, that is, control the modem to shut down, so that it is possible to control the modem to shut down normally in the case that the AP receives a shutdown instruction.

Optionally, in this embodiment of the present disclosure, in the case that the power control device provided in this embodiment of the present disclosure uses the foregoing "first implementation manner" or "second implementation manner", after the AP receives a shutdown instruction, it is possible to control the first power management module to stop power supply to the modem by using the foregoing Method 1 and/or Method 2 described above. Then, after a preset duration, the foregoing first control signal is output to the control circuit, to trigger the control circuit to convert the control signal output by the second power management module to the first power management module from the foregoing second control signal into the third control signal, so that the first power management module stops power supply to the modem under the control of the third control signal. In this way, the power control device provided in the present disclosure may control the first power management module to stop power supply to the modem by using at least two methods, that is, the power control device provided in this embodiment of the present disclosure may control the first power management module by using multiple control methods to stop power supply to the modem, so that it is possible to reliably control the modem to shut down.

Optionally, in this embodiment of the present disclosure, the foregoing preset duration may be a numeric value preset in the power control device. The preset duration may be preset in the power control device by the manufacturer of the power control device according to the performance of the power control device. This may be determined based on an actual use requirement, and is not limited in this embodiment of the present disclosure.

It should be noted that if the power control device provided in this embodiment of the present disclosure is implemented through the foregoing "first implementation manner" or "second implementation manner", the power control device provided in this embodiment of the present disclosure also controls the first power management module to stop power supply to the modem by using at least one of the "Method 1" or "Method 2" in the foregoing embodiment. Even if the communication between the AP and the modem and/or between the AP and the second power management module is abnormal, that is, the AP cannot control the first power management module to stop power supply to the modem through "Method 1" and/or "Method 2", the power control device provided by the embodiment of the present disclosure may also output the foregoing first control signal to the control circuit, so that the high-level reset signal output by the second power management module to the first power management module is converted into a low-level reset signal (that is, controlling the conversion of the second control signal into the third control signal). As a result, the first power management module can stop power supply to the modem under the control of the low-level reset signal, that is, control the modem to shut down. In this case, it is possible to control the modem to shut down normally in the case that the AP receives a shutdown instruction. That is, even if the foregoing "Method 1" and/or "Method 2" fails and it is not possible to control the first power management module to stop power supply to the modem, the power control device provided in this embodiment of the present disclosure is still able to control the first power management module to stop power supply to the modem, to achieve reliable shutdown of the modem.

In this embodiment of the present disclosure, after the AP receives a shutdown instruction, the power control device provided in this embodiment of the present disclosure may control the first power management module by using multiple control methods (such as the foregoing Method 1, Method 2) to stop supply power to the modem, to control the shutdown of the modem. In this way, in the case that the AP receives a shutdown instruction, even if a certain control method is abnormal, the power control device provided in this embodiment of the present disclosure is still able to control the first power management module by using another control method to stop power supply to the modem, so that it is possible to control reliable shutdown of the modem, thereby avoiding abnormal power consumption of the terminal device due to a shutdown failure of the modem.

It should be noted that in this embodiment of the present disclosure, the power control device shown in each of the foregoing accompanying drawings is described by using an accompanying drawing in this embodiment of the present disclosure as an example. During specific implementation, the power control device shown in each of the foregoing accompanying drawings may be implemented in combination with any other accompanying drawings illustrated in the foregoing embodiment, and details are not described again in this embodiment.

An embodiment of the present disclosure provide a terminal device, where the terminal device may include a power control device. The power control device may be the power control device in any one of the foregoing embodiments shown in FIGS. 2 to 5. For the description of the power control device, reference may be made to the description of the power control device in the foregoing embodiments corresponding to FIGS. 2 to 5. To avoid repetition, details are not described again in this embodiment.

Optionally, the terminal device in this embodiment of the present disclosure may be a mobile terminal device or a non-mobile terminal device. Exemplarily, the mobile terminal device may be a mobile phone, a tablet computer, a notebook computer, a palmtop computer, a vehicle-mounted terminal, a wearable device, an ultra-mobile personal computer (UMPC), a netbook, a personal digital assistant (PDA), or the like. The non-mobile terminal device may be a personal computer (PC), a television (TV), a teller machine, a self-service machine, or the like. This may be determined based on an actual use requirement, and is not specifically limited in this embodiment of the present disclosure.

An embodiment of the present disclosure provides a terminal device, where the terminal device includes a power control device, the power control device includes a modem, a first power management module connected to the modem, an AP, a second power management module connected to the AP, and a control circuit connected to the AP, the first power management module and the second power management module. After the AP receives a shutdown instruction or an abnormal power-down is detected, it is possible to output a control signal to the control circuit to trigger the control circuit to convert, under the control of the control signal, a second control signal output by the second power management module to the first power management module into a third control signal, so that the first power management module stops power supply to the modem under the control of the third control signal. In this way, in the case that the AP receives a shutdown instruction or an abnormal power-down is detected, even in the case of anomaly in communication between the AP and the modem, the power control device provided in this embodiment of the present disclosure can still trigger the control circuit to control conversion of the second control signal output by the second power management module to the first power management module into a third control signal by outputting a control signal to the control circuit, so as to control the first power management module to stop power supply to the modem, that is, shutdown of the modem can be controlled, thereby avoiding abnormal power consumption of a terminal device due to shutdown failure of the modem.

Figure 6:
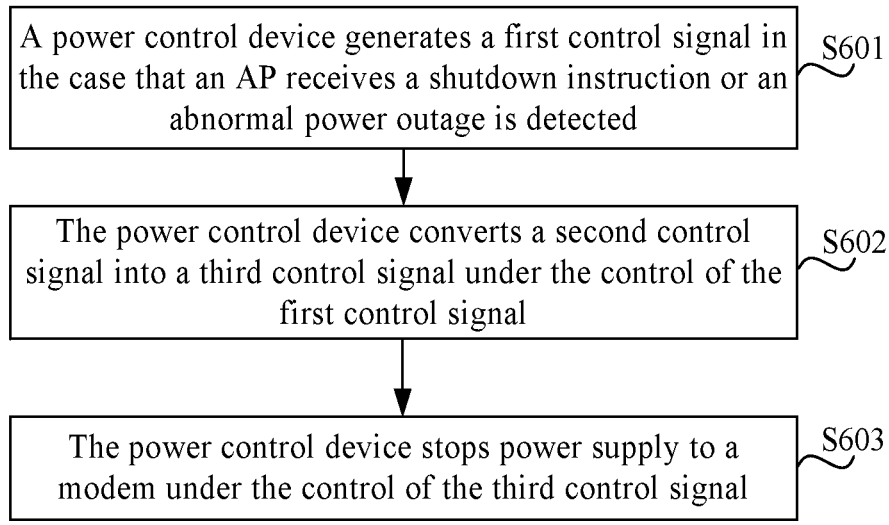
FIG. 6 is a first schematic diagrams of a power control method provided in an embodiment of the present disclosure.

As shown in FIG. 6, an embodiment of the present disclosure provides a power control method. The method may be applied to a power control device (for example, the power control device may be the power control device provided in any one of the foregoing embodiments in FIGS. 2 to 5), where the power control device may include a modem, a first power management module connected to the modem, an AP, and a second power management module connected to the AP. The method may include the following S601-S603.

S601. The power control device generates a first control signal in the case that the AP receives a shutdown instruction or an abnormal power-down is detected.

S602. The power control device converts a second control signal into a third control signal under the control of the first control signal.

S603. The power control device stops power supply to the modem under the control of the third control signal.

Among them, the foregoing second control signal may be a signal output by the second power management module to the first power management module before the AP receives a shutdown instruction or an abnormal power-down is detected.

Optionally, the foregoing first control signal may be a low-level control signal, the foregoing second control signal may be a high-level reset signal, and the foregoing third control signal may be a low-level reset signal.

In this embodiment of the present disclosure, for the relevant description of the power control device, shutdown instruction, abnormal power-down, first control signal, second control signal, and third control signal, reference may be made to the foregoing relevant description of the power control device, shutdown instruction, abnormal power-down, first control signal, second control signal, and third control signal in the foregoing embodiments shown in FIGS. 2 to 5, and details are not described again in this embodiment.

An embodiment of the present disclosure provide a power control method, where the method may be applied to a power control device, a modem, a first power management module connected to the modem, an AP, and a second power management module connected to the AP. After the power control device receives a shutdown instruction or an abnormal power-down is detected, it is possible to generate a first control signal, convert, under the control of the first control signal, a second control signal output by the second power management module to the first power management module into a third control signal, and then stop power supply to the modem under the control of the third control signal. In this way, when the power control device receives a shutdown instruction or an abnormal power-down is detected, even in the case of anomaly in the communication between the AP and another module (such as a modem), it is still possible for the power control method provided by the embodiment of the present disclosure to convert, according to the first control signal generated by the power control device, the second control signal output by the second power management module to the first power management module into the third control signal, so as to stop power supply to the modem under the control of the third control signal, that is, to control the shutdown of the modem, thereby avoiding abnormal power consumption of a terminal device due to a shutdown failure of the modem.

Optionally, in this embodiment of the present disclosure, after the power control device generates the foregoing first control signal, the power control device may also stop power supply to the AP under the control of the first control signal.

Figure 7:
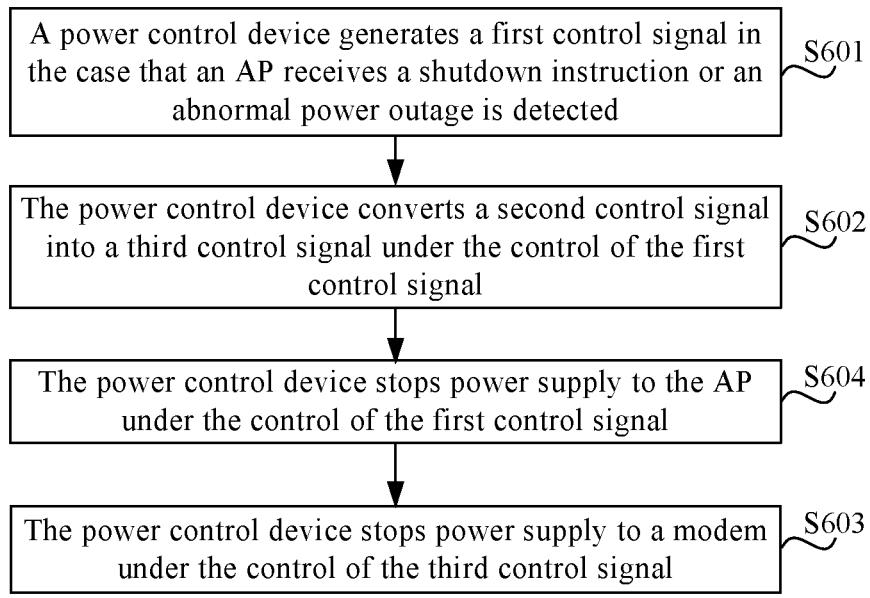
FIG. 7 is a second schematic diagram of a power control method provided in an embodiment of the present disclosure.

Exemplarily, with reference to FIG. 6, as shown in FIG. 7, after the foregoing S602, the power control method provided in this embodiment of the present disclosure may further include the following S604.

S604. The power control device stops power supply to the AP under the control of the first control signal.

It should be noted that in this embodiment of the present invention, a performing sequence of S603 and S604 is not limited. That is, in this embodiment of the present disclosure, S603 may be performed before S604; or S604 may be performed before S603, or S603 and S604 may be performed at the same time. Among them, the foregoing FIG. 7 exemplarily illustrates performing S604 before performing S603 as an example.

In this embodiment of the present disclosure, after the power control device generates the foregoing first control signal, the power control device can stop power supply to the AP under the control of the first control signal. In this way, in the case that the power control device receives a shutdown instruction or an abnormal power-down is detected, in the power control method provided by this embodiment of the present disclosure, it is possible to stop power supply to the AP through the control of the first control signal, that is, to control the AP to shut down. In this way, it is possible to avoid abnormal power consumption of a terminal device due to a shutdown failure of the AP.

Figure 8:
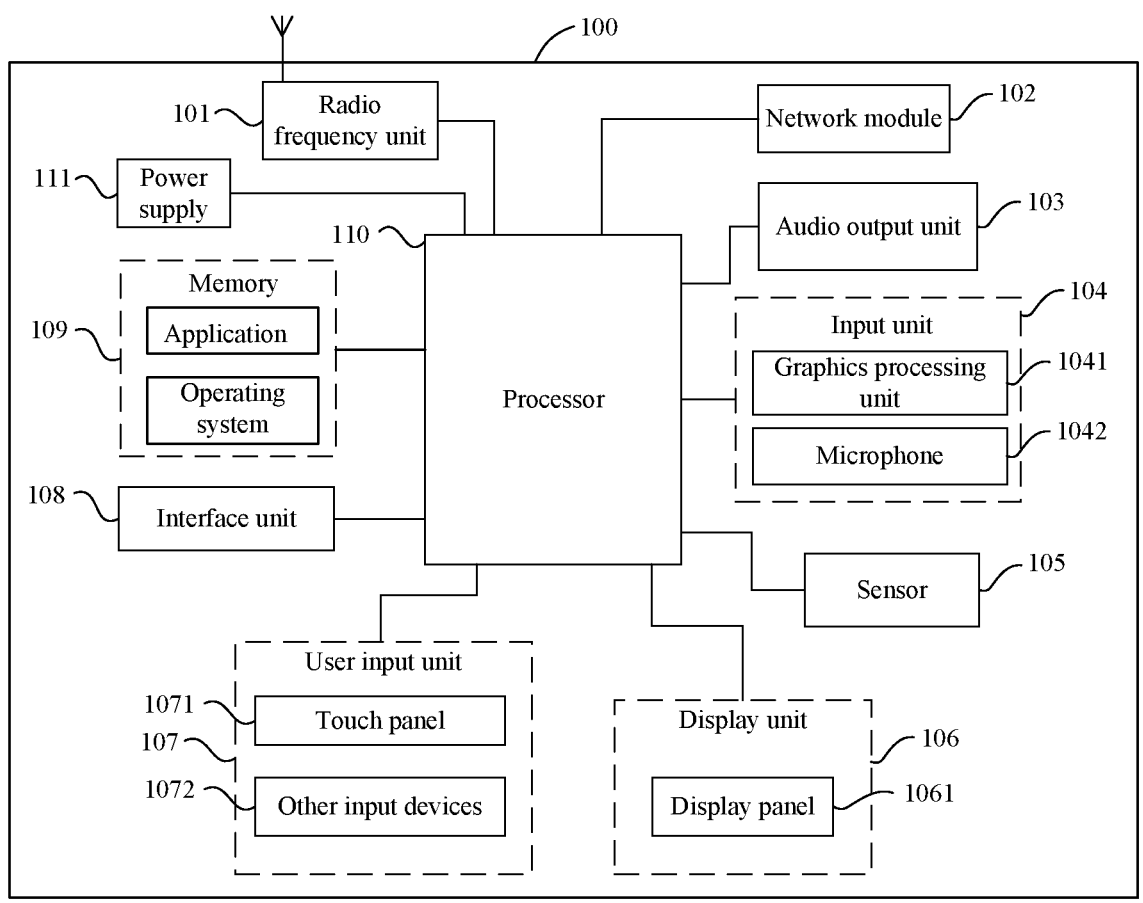
FIG. 8 is a schematic diagram of hardware of a terminal device provided in an embodiment of the present disclosure.

FIG. 8 is a schematic diagram of hardware of a terminal device implementing the embodiments of the present disclosure. As shown in FIG. 8, the terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the terminal device shown in FIG. 8 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

In this embodiment of the present disclosure, the foregoing power supply 111 may include the first power management module and the second power management module in the power control device in this embodiment of the present disclosure, and a battery. The processor 110 may include a modem, an AP, and a control circuit in the power control device in this embodiment of the present disclosure.

Among them, the processor 110 is configured to generate a first control signal in the case that a shutdown instruction is received or an abnormal power-down is detected; to convert, under the control of the first control signal, a second control signal into a third control signal; and to stop, under the control of the third control signal, power supply to a modem in the processor 110. Among them, the second control signal is a signal output by the second power management module in the power supply 111 to the first power management module in the power supply 111 before the processor 110 receives a shutdown instruction or an abnormal power-down is detected.

An embodiment of the present disclosure provides a terminal device, where the terminal device includes a power control device, the power control device includes a modem, a first power management module connected to the modem, an AP, a second power management module connected to the AP, and a control circuit connected to the AP, the first power management module and the second power management module. After the AP receives a shutdown instruction or an abnormal power-down is detected, it is possible to output a control signal to the control circuit to trigger the control circuit to convert, under the control of the control signal, a second control signal output by the second power management module to the first power management module into a third control signal, so that the first power management module stops power supply to the modem under the control of the third control signal. In this way, in the case that the AP receives a shutdown instruction or an abnormal power-down is detected, even in the case of anomaly in communication between the AP and the modem, the power control device provided in this embodiment of the present disclosure can still trigger the control circuit to control conversion of the second control signal output by the second power management module to the first power management module into a third control signal by outputting a control signal to the control circuit, so as to control the first power management module to stop power supply to the modem, that is, shutdown of the modem can be controlled, thereby avoiding abnormal power consumption of a terminal device due to shutdown failure of the modem.

It should be understood that, in this embodiment of the present disclosure, the radio frequency unit 101 may be configured to receive and send information or a signal in a call process. For example, after receiving downlink data from a base station, the radio frequency unit 101 sends the downlink data to the processor 110 for processing. In addition, the radio frequency unit 101 sends uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may also communicate with another communications device through a wireless communication system and network.

The terminal device provides wireless broadband Internet access for the user by using the network module 102, for example, helping the user to send and receive an e-mail, brows a web page, and access streaming media.

The audio output unit 103 can convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The graphics processing unit 1041 processes image data of a still picture or a video obtained by an image capture device (for example, a camera) in a video capture mode or an image capture mode. The processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and may process such sound into audio data. The processed audio data may be converted, in a call mode, into a format that may be sent to a mobile communication base station by using the radio frequency unit 101 for output.

The terminal device 100 further includes at least one sensor 105, for example, an optical sensor, a motion sensor, and other sensors. For example, the light sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 moves to an ear. As a type of motion sensor, an accelerometer sensor may detect an acceleration value in each direction (generally, three axes), and detect a value and a direction of gravity when the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 106 is configured to display information inputted by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive inputted digit or character information, and generate key signal input related to user setting and function control of the terminal device. For example, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection device and a touch controller. The touch detection device detects a touch position of the user, detects a signal brought by the touch operation, and sends the signal to the touch controller. The touch controller receives touch information from the touch detection device, converts the touch information into touch point coordinates, and sends the touch point coordinates to the processor 110, and can receive and execute a command sent by the processor 110. In addition, the touch panel 1071 may be implemented in a plurality of forms, for example, as a resistive, capacitive, infrared, or surface acoustic wave touch panel. In addition to the touch panel 1071, the user input unit 107 may further include the another input device 1072. For example, the another input device 1072 may include, but not limited to, a physical keyboard, a function key (for example, a volume control key or a switch key), a trajectory ball, a mouse, and a joystick. Details are not described herein again.

Optionally, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 8, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external device to the terminal device 100. For example, the external device may include a wired or wireless headset port, an external power supply (or a battery charger) port, a wired or wireless data port, a memory card port, a port for connecting an device having an identification module, an audio input/output (I/O) port, a video I/O port, a headset port, and the like. The interface unit 108 may be configured to receive an input (for example, data information or power) from an external device and transmit the received input to one or more elements in the terminal device 100, or may be configured to transmit data between the terminal device 100 and the external device.

The memory 109 may be configured to store a software program and various data. The memory 109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 109 may include a high-speed random access memory, or may include a nonvolatile memory, for example, at least one disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, an application processor and a modem processor may be integrated into the processor 110. The application processor mainly processes an operating system, a user interface, an application, and the like. The modem processor mainly processes wireless communication. It may be understood that the modem processor may alternatively not be integrated into the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, an embodiment of the present disclosure further provides a terminal device, including the processor 110 and the memory 109 that are shown in FIG. 8, and a computer program stored in the memory 109 and executable on the processor 110, where the computer program, when executed by the processor 110, implements the processes of the foregoing object control method embodiments, and the same technical effects can be achieved. To avoid repetition, details are not described herein again.

An embodiment of the present disclosure further provides a non-transitory computer readable storage medium. The non-transitory computer readable storage medium stores a computer program, the computer program, when executed by a processor, implements the processes of the foregoing embodiments of the object control method, and same technical effects can be achieved. To avoid repetition, details are not described herein again. The non-transitory computer-readable storage medium may include a read-only memory (ROM), a random access memory (RAM), a magnetic disk, an optical disc, or the like.

It should be noted that, in this specification, the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. In the absence of more restrictions, an element defined by the statement "including a . . . " does not exclude another same element in a process, method, article, or device that includes the element.

According to the foregoing descriptions of the implementations, a person skilled in the art may clearly understand that the foregoing method in the embodiment may be implemented by using software plus a required universal hardware platform, or certainly may be implemented by using hardware. However, in many cases, the former is a better implementation. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A power control device, the power control device comprising: a modem, a first power management module connected to the modem, an application processor (AP), a second power management module connected to the AP, and a control circuit connected to the AP, the first power management module and the second power management module; wherein
    the second power management module is configured to output a second control signal to the first power management module before the AP receives a shutdown instruction or an abnormal power-down is detected;
    the AP is configured to generate a first control signal and output the first control signal to the control circuit in a case that a shutdown instruction is received or an abnormal power-down is detected;
    the control circuit is configured to convert the second control signal into a third control signal under control of the first control signal, so that the second power management module outputs the third control signal to the first power management module;
    the first power management module is configured to stop power supply to the modem under control of the third control signal.

2. The power control device according to claim 1, wherein the AP is further configured to output the first control signal to the second power management module; and
    the second power management module is further configured to stop power supply to the AP under the control of the first control signal.

3. The power control device according to claim 2, wherein the first control signal is a low-level control signal, the second control signal is a high-level reset signal, and the third control signal is a low-level reset signal.

4. The power control device according to claim 3, wherein the control circuit comprises a phase inverter and a switching transistor; and
    an input terminal of the phase inverter is connected to the AP, an output terminal of the phase inverter is connected to a first terminal of the switching transistor, a second terminal of the switching transistor is connected to both the first power management module and the second power management module, and a third terminal of the switching transistor is grounded.

5. The power control device according to claim 4, wherein the phase inverter is a NOT gate, and the switching transistor is an N-type field effect transistor.

6. The power control device according to claim 3, wherein the control circuit comprises a switching transistor;
    a first terminal of the switching transistor is connected to the AP, a second terminal of the switching transistor is connected to both the first power management module and the second power management module, and a third terminal of the switching transistor is grounded.

7. The power control device according to claim 6, wherein the switching transistor is a P-type field effect transistor.

8. A power control method, applied to a power control device, wherein the power control device comprises a modem, a first power management module connected to the modem, an application processor (AP), and a second power management module connected to the AP, and the method comprises:
    generating a first control signal in a case that the AP receives a shutdown instruction or an abnormal power-down is detected;
    converting, under control of the first control signal, a second control signal into a third control signal, wherein the second control signal is a signal output by the second power management module to the first power management module before the AP receives a shutdown instruction or an abnormal power-down is detected;
    stopping power supply to the modem under control of the third control signal.

9. The method according to claim 8, wherein after the generating a first control signal, the method further comprises:
    stopping, under the control of the first control signal, power supply to the AP.

10. The method according to claim 9, wherein the first control signal is a low-level control signal, the second control signal is a high-level reset signal, and the third control signal is a low-level reset signal.

11. A terminal device, comprising a power control device, wherein the power control device comprises a modem, a first power management module connected to the modem, an application processor (AP), and a second power management module connected to the AP, and the terminal device further comprises: a processor, a memory, and a computer program stored in the memory and executable on the processor; the computer program, when executed by the processor, causes the power control device to perform:
    generating a first control signal in a case that the AP receives a shutdown instruction or an abnormal power-down is detected;
    converting, under control of the first control signal, a second control signal into a third control signal, wherein the second control signal is a signal output by the second power management module to the first power management module before the AP receives a shutdown instruction or an abnormal power-down is detected;
    stopping power supply to the modem under control of the third control signal.

12. The terminal device according to claim 11, wherein the computer program, when executed by the processor, causes the power control device to perform:
    stopping, under the control of the first control signal, power supply to the AP.

13. The terminal device according to claim 12, wherein the first control signal is a low-level control signal, the second control signal is a high-level reset signal, and the third control signal is a low-level reset signal.

14. A non-transitory computer-readable storage medium, applied to a terminal device, wherein the terminal device comprises a power control device, and the power control device comprises a modem, a first power management module connected to the modem, an application processor (AP), and a second power management module connected to the AP; the non-transitory computer-readable storage medium stores a computer program, and the computer program, when executed by a processor of the terminal device, causes the power control device to perform:

generating a first control signal in a case that the AP receives a shutdown instruction or an abnormal power-down is detected;

converting, under control of the first control signal, a second control signal into a third control signal, wherein the second control signal is a signal output by the second power management module to the first power management module before the AP receives a shutdown instruction or an abnormal power-down is detected;

stopping power supply to the modem under control of the third control signal.

15. The non-transitory computer-readable storage medium according to claim 14, wherein the computer program, when executed by the processor, causes the power control device to perform:

stopping, under the control of the first control signal, power supply to the AP.

16. The non-transitory computer-readable storage medium according to claim 15, wherein the first control signal is a low-level control signal, the second control signal is a high-level reset signal, and the third control signal is a low-level reset signal.

* * * * *